United States Patent [19]
Brint

[11] Patent Number: 6,035,882
[45] Date of Patent: *Mar. 14, 2000

[54] MONITORING CONDENSATE TRAPS

[75] Inventor: Michael John Brint, Churchdown, United Kingdom

[73] Assignee: Spirax-Sarco Limited, Cheltenham, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 09/192,550

[22] Filed: Nov. 13, 1998

[30] Foreign Application Priority Data

Dec. 11, 1997 [GB] United Kingdom ............... 9726225

[51] Int. Cl.$^7$ ........................................ F16T 1/00
[52] U.S. Cl. .................. 137/182; 137/183; 137/187; 137/192; 137/558; 236/94
[58] Field of Search .................... 137/182, 183, 137/187, 192, 558; 236/94

[56] References Cited

U.S. PATENT DOCUMENTS 4,888,978  12/1989  Yumoto et al. ...................... 73/40
5,069,247  12/1991  Foller et al. ........................ 137/558
5,445,187   8/1995  Farquhar ............................ 137/182 X
5,687,755  11/1997  Farquhar et al. .................... 137/183 X

FOREIGN PATENT DOCUMENTS 2 022 846  12/1979  United Kingdom .

Primary Examiner—Gerald A. Michalsky
Attorney, Agent, or Firm—Duane Morris & Heckscher, LLP

[57] ABSTRACT

A condensate trap assembly includes a monitoring device 4 which is closely coupled to, or integral with, a condensate trap 2. The monitoring device 4 includes a flow restriction 56 and a condensate receiving chamber 48 which accommodates a sensor 66. The chamber 48 communicates with an inlet passage 52 on the upstream side of the flow restriction 56 and, via a bore 50, with an outlet passage 54 on the downstream side of the flow restriction 56. The sensor 66 provides an indication of the condition of the condensate trap 2, in accordance with whether the sensor tip 68 is submerged in condensate and in accordance with the temperature of the condensate.

11 Claims, 2 Drawing Sheets

MONITORING CONDENSATE TRAPS

FIELD OF THE INVENTION

This invention relates to a device for monitoring the condition of a condensate trap.

BACKGROUND OF THE INVENTION AND PRIOR ART

GB-A-2302722 discloses an installation including a condensate trap, in which a monitoring device is installed upstream of the condensate trap for monitoring the condition of the condensate trap. The condensate trap itself includes a valve arrangement for controlling the operation of the trap, and this valve is operated by a position controller which operates in response to signals received, inter alia, from a sensor within the monitoring device.

Because the monitoring device is a separate component from the condensate trap, its installation involves additional work, requiring additional components, such as connection fittings. An object of the invention is to provide a monitoring device which is integrated with the condensate trap, both to save such additional work and additional components and to improve the appearance of the installation as a whole.

SUMMARY OF THE INVENTION

According to the present invention there is provided a device for monitoring the condition of a condensate trap, the device comprising an inlet passage and an outlet passage which communicate with each other through a first flow path and a second flow path, the first flow path comprising a flow restriction, and the second flow path comprising a condensate receiving chamber which is situated, in use, at a level below the inlet passage and which communicates with the inlet passage through a first flow passageway and with the outlet passage through a second flow passageway, the device including a sensor having a sensor element disposed within the condensate receiving chamber at a level above that at which the second flow passageway opens into the condensate receiving chamber.

A monitoring device constructed in accordance with the present invention can be integrated into a condensate trap, either by accommodating the components of the monitoring device within the body of the condensate trap, or by coupling the monitoring device directly to the condensate trap without any intervening pipe work.

The inlet and outlet passages of the monitoring device may be generally aligned with one another, with the flow restriction disposed between them. Consequently, the main flow path through the monitoring device may comprise a straight passage with the flow restriction disposed within it. The condensate receiving chamber may then be effectively branched from the main flow passage.

The sensor preferably projects upwardly into the condensate receiving chamber from below, with the sensor element provided at the free tip of the sensor. Where the monitoring device is coupled with, or integrated with, a condensate trap having a control valve, the sensor may extend parallel to an operating member of the control valve. The sensor preferably comprises both a level sensor and a temperature sensor, so that it is responsive both to the level of condensate in the condensate receiving chamber and to the temperature within the chamber.

In a preferred embodiment, the condensate receiving chamber has a lower region and an upper region which is of smaller diameter than the lower region. The sensor element is preferably disposed in the upper region, and the second flow passageway preferable opens into the condensate receiving chamber at the transition between the upper and lower regions.

The inlet and outlet passages, and the flow restriction, may be formed in an inner body of the device, and the condensate receiving chamber may be formed in an outer body which has an opening that receives the inner body. The inner body may then have bores which extend from the inlet passage and outlet passage respectively to the exterior surface of the inner body, so as to provide the first and second flow passageways. These bores may open, at the external surface of the inner body, into respective annular grooves so that the bores can communicate with the condensate receiving chamber regardless of the orientation of the outer body with respect to the inner body. The condensate receiving chamber may open at the inner surface of the opening in the outer body for communication with the bore extending from the inlet passage. Similarly, there may be a further bore provided in the outer body extending from the condensate receiving chamber to the inner surface of the opening of the outer body for communication with the bore extending from the outlet passage.

The present invention also provides a condensate trap assembly including a condensate trap and a monitoring device as defined above, in which the outlet passage of the monitoring device communicates with, or constitutes, an inlet of the condensate trap.

DETAILED DESCRIPTION OF A PREFERRED EMBODIMENT

Figure 1:
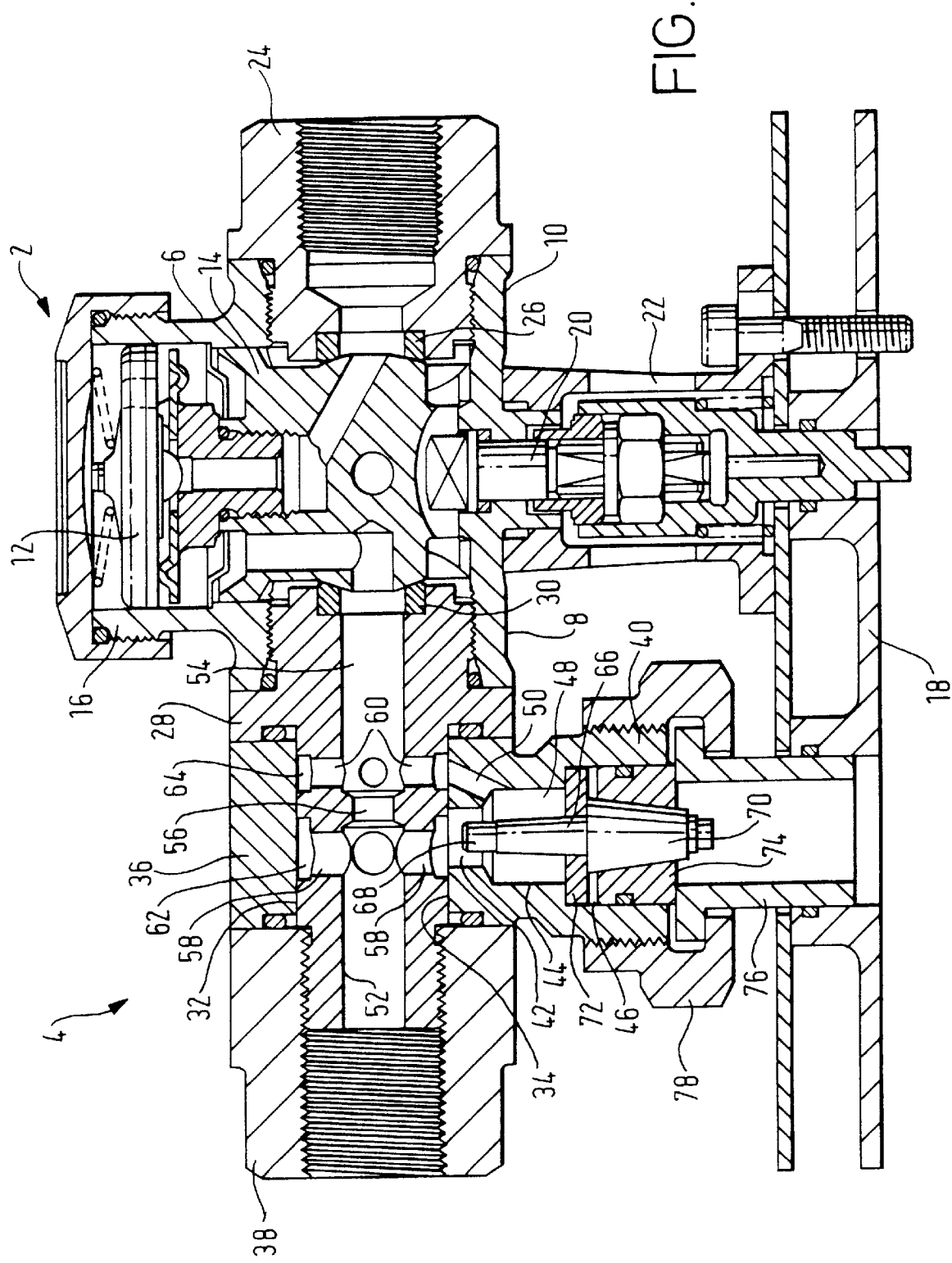
FIG. 1 is a cross-sectional view of a condensate trap assembly including a monitoring device.

The assembly shown in FIG. 1 comprises a condensate trap, or steam trap, 2 and a monitoring device 4.

The steam trap 2 is similar to that disclosed in GB 2302722, and comprises a valve body 6 having an inlet spigot 8 and an outlet spigot 10. The valve body 6 accommodates a steam trap element 12 and a valve element 14. The stream trap element 12 is situated in a trap chamber 16.

The valve element 14 is rotatable between three positions, which can be termed "bypass", "stop" and "trap", in which, respectively, the trap element 12 is bypassed, the flow through the trap 2 is shut off entirely and the flow through the trap 2 takes place via the trap element 12. The operation of the steam trap 2 is more fully described in GB-A-2302722.

Rotation of the valve element 14 is performed by an electrically powered rotary positioner (not shown) which is accommodated in a housing of which only one wall 18 is shown. The positioner motor drives an output spindle 20 which engages the valve element 14. The spindle 20 is accommodated in a housing 22 secured to the wall 18.

The outlet spigot 10 is internally screw-threaded, and receives an outlet fitting 24. A sealing ring 26 is maintained in contact with the valve element 14 by the outlet fitting 24.

The inlet spigot 8 is also internally screw-threaded and receives an inlet fitting 28 which constitutes an inner body of the monitoring device 4. A sealing ring 30 is held against the valve element 14 by the inner body 28. The inner body 28 has an outer surface 32 which extends through an opening 34 in an outer body 36. The inner and outer bodies 28 and 36 are secured in position relatively to each other by a nut 38 which engages a screw-thread provided on the end of the inner body 28 away from the valve body 6.

The outer body 36 has a radial extension 40 having a stepped internal bore having three regions 42, 44, 46 of progressively larger diameter. The regions 42 and 44 define a condensate receiving chamber 48 which opens, via the region 42, at the inner surface of the opening 34. A bore or drilling 50 also extends from the transition between the regions 42 and 44 to the internal surface of the opening 34 at a position axially spaced from the region 42.

The inner body 28 has a through passageway comprising an inlet passage 52, an outlet passage 54 and a flow restriction 56. The outlet passage 54 constitutes the inlet of the trap 2. The inlet and outlet passages 52, 54 and aligned with each other, and are separated from each other by the flow restriction 56.

Bores 58 and 60 extend radially from the inlet passage 52 and outlet passage 54 respectively, and open into annular grooves 62 and 64 into which open the narrow region 42 of the condensate receiving chamber 48 and the drilling 50.

A sensor 66 extends from below into the condensate receiving chamber 48. The tip 68 of the sensor 66 constitutes a level and temperature sensing element, and is disposed in the narrower region 42 of the condensate receiving chamber 48. The sensor 66 has a tapered mounting region 70 which is secured against a sealing plate 72 by a collar 74. The collar 74 is held in position by a tubular shroud 76 and a nut 78.

The shroud 76 engages the wall 18 and provides a conduit for electrical leads (not shown) extending from the sensor 66.

For operation, the assembly shown in FIG. 1 is connected to a steam process line at the nut 38. The fitting 24 is connected to a condensate return line.

In normal operation, when the system is up to temperature, the valve element is in the "trap" position as shown in FIG. 1, and the trap element 12 will operate to open the trap 2 when the temperature at the trap element 12 is reduced owing to the presence of condensate. When all condensate has been discharged, the temperature at the trap element 12 will rise again, and the trap 2 will close. It will be appreciated that the main flow of condensate during discharge will be linear, through the inlet and outlet passages 52, 54 via the flow restriction 56. Thus, spurious results can be minimized, such as might occur if the primary flow of fluid takes place along a tortuous path.

Condensate reaching the assembly will initially accumulate in the condensate receiving chamber 48, and any minor leakage of steam through the trap 2 will cause steam to pass at a low flow rate through the inlet passage 52, the flow restriction 56 and the outlet passage 54 of the monitoring device. Initially, some flow may also take place via the condensate receiving chamber 48 and through the drilling 50, but this will stop when, as in the normal condition, the level of condensate in the condensate receiving chamber 48 is above the level at which the drilling 50 opens into the condensate receiving chamber 48.

Thus, in the normal operating condition, the tip 68 of the sensor 66 is immersed in condensate, but the condensate is hot, owing to the presence of steam at or close to the inlet passage 52. However, should excessive leakage occur at the steam trap 2, the flow rate through the restriction 56 will increase, causing a pressure drop across the restriction 56. The higher pressure at the inlet passage 52 will act through the bores 58 and the groove 62 on the condensate in the condensate receiving chamber 48, forcing it through the drilling 50, with the result that the level of condensate will drop below the tip 68 of the sensor 66. The sensor 68 will then produce a signal representing a trap leakage condition, and, if this condition persists, a control signal will be sent to the rotary positioner to cause the valve element 14 to be moved to the "stop" position to shut off the flow through the steam trap 2 by closing the downstream end of the outlet passage 54.

If, as will normally happen, condensate builds up in the condensate receiving chamber 48, the tip 68 of the sensor 66 will again become submerged and this will cause the valve element 14 to return to the "trap" position. If the leak persists, the cycle will be repeated, and the steam trap 2 will continue to operate as a trap independently of the trap element 12, by movement of the valve element 14.

If, instead of leaking, the trap element 12 remains closed despite the presence of condensate, the assembly will become waterlogged, with condensate building up in the inlet passage 52 and upstream of it. This condensate will cool, and the sensor tip 68 will detect both the cooling and the fact that it is submerged, and will provide a signal which will cause the rotary positioner to move the valve element 14 to the "bypass" position, providing a direct through passage from the outlet passage 54 of the monitoring device to the outlet 24 of the steam trap. The accumulated condensate will thus be discharged through the valve element 14 and, when steam passes through the monitoring device 4, the resulting pressure drop across the flow restriction 56 will cause condensate to be discharged, as before, from the condensate receiving chamber 48, leaving the sensor tip 68 above the level of condensate and subjected to hot steam. When this happens, the sensor 66 will send a signal causing the rotary positioner to return the valve element 14 to the "stop" or "trap" position depending on circumstances.

It will therefore be appreciated that, even if the trap element 12 fails, either partly open to allow leakage, or closed, the surroundings of the sensor tip 68 will provide sensor outputs to enable control of the valve element 14 so as to enable the steam trapping operation to continue independently of the trap element 12.

The configuration of the monitoring device 4 provides a compact unit capable of being closely coupled to the steam trap 2, without any intervening pipe work. Also, because the sensor 66 is generally parallel to the control spindle 20 of the valve element 14, it is relatively simple to couple both the sensor enclosure 40, 76 and the housing 22 of the spindle 20 to the wall 18 of the housing for the rotary positioner and the associated control circuitry. Furthermore, since the monitoring device 4 requires only two major components, namely the inner body 28 and the outer body 36, its manufacture and assembly are greatly simplified, particularly since the inner body 28 can be directly fitted to the inlet spigot 8 of the valve body 6.

Figure 2:
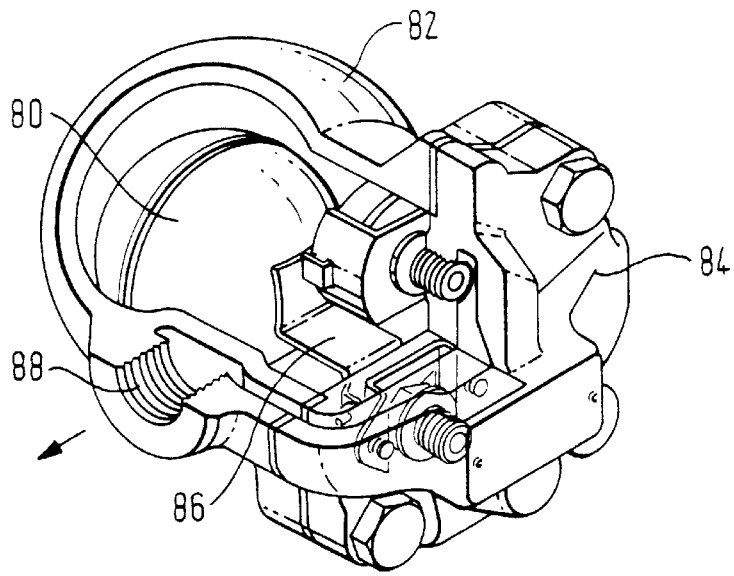
FIG. 2 is a cut-away perspective view of a float trap.
Figure 3:
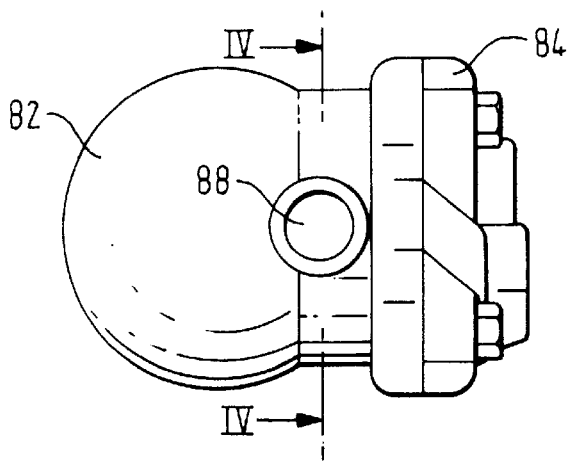
FIG. 3 is a side view of the float trap of FIG. 2.
Figure 4:
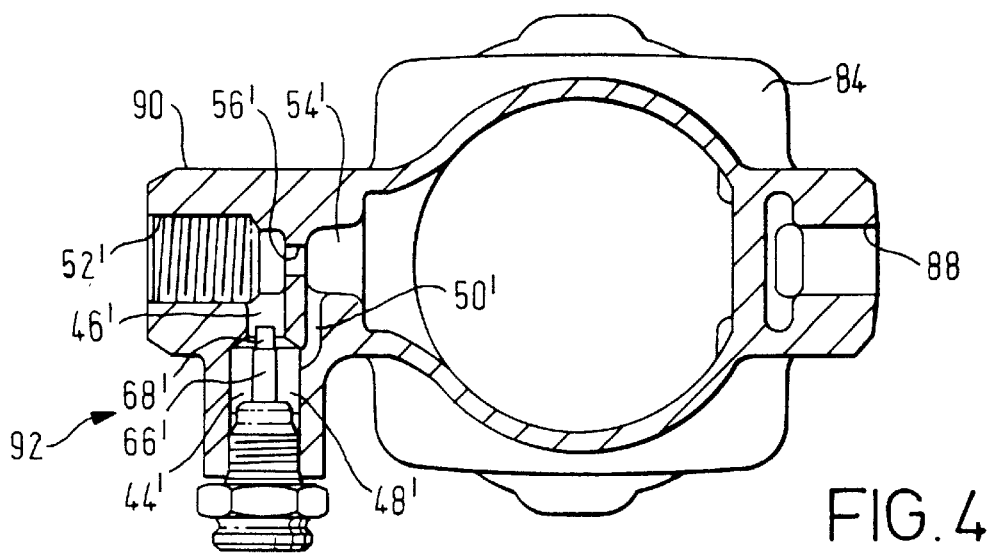
FIG. 4 is a cross-sectional view taken on the line IV—IV in FIG. 3.

FIGS. 2 to 4 show another embodiment of a steam trap having a monitoring device. In this embodiment, the steam trap is a float trap comprising a float 80 mounted in a housing made up of a casing 82 and an end cap 84. The float 80 is mounted on a lever 86 which controls a valve mechanism (not shown in detail) which opens and closes to control the discharge of condensate through an outlet 88 as the float 80 rises and falls.

As shown in FIG. 4, the casing 82 has a lateral extension 90, which accommodates a monitoring device 92. This extension has passageways and components which correspond to those in the embodiment of FIG. 1, and are represented by the same reference numerals with the addition of a '. Thus, in the embodiment of FIG. 4, the inlet passage 52' of the monitoring device 92 communicates with the outlet passage 54' through a flow restriction 56'. The outlet passage 54' constitutes also the inlet to the steam trap itself. The sensor 66' extends into the condensate receiving chamber 48', with its tip 68' being situated in the upper region of the chamber 48' above the level at which a passageway 50', corresponding to the drilling 50 of FIG. 1, opens into the condensate receiving chamber 48'.

Thus, it will be appreciated that the monitoring device 92 of FIG. 4 operates in an analogous way to the monitoring device 4 of FIG. 1. However, in the embodiment of FIGS. 2 to 4, there is no automatic valve mechanism to provide steam-trapping operation in the event of failure of the valve mechanism operated by the float 80. Nevertheless, the output of the sensor 66' can be used to provide warning and alarm signals to alert operating personnel to the need to rectify faulty operation of the steam trap. In the case of either embodiment, such warning and alarm signals can either be generated at the steam trap itself, or at a remote monitoring station which may, for example, receive signals from the monitoring devices of steam traps at several locations in a plant.

I claim:

1. A device for monitoring the condition of a condensate trap, the device comprising:
    an inlet passage;
    an outlet passage;
    a first flow path in the fluid communication between the inlet passage and the outlet passage;
    a flow restriction provided in the first flow path;
    a second flow path in fluid communication between the inlet passage, and the outlet passage;
    a condensate receiving chamber provided in the second flow path at a level below the inlet passage, the condensate receiving chamber being closed at its lower end;
    a first flow passageway in fluid communication between the inlet passage and the condensate receiving chamber;
    a second flow passageway in fluid communication between the outlet passage and the condensate receiving chamber, the second passageway opening into the condensate receiving chamber at a first level which is above the lower end of the condensate receiving chamber; and
    a sensor having a sensor element disposed within the condensate receiving chamber at a second level, wherein the second level is above the first level.

2. A device as claimed in claim 1, in which the inlet and outlet passages are generally aligned with each other.

3. A device as claimed in claim 1, in which the sensor projects upwardly into the condensate receiving chamber, the sensor element being situated at the tip of the sensor.

4. A device as claimed in claim 1, in which the condensate receiving chamber has a lower region and an upper region, the upper region having a smaller cross-sectional area than the lower region.

5. A device as claimed in claim 4, in which the sensor element is disposed in the upper region of the condensate receiving chamber.

6. A device as claimed in claim 4, in which the second flow passageway opens into the condensate receiving chamber at the transition between the upper and lower regions.

7. A device as claimed in claim 1, which comprises an inner body and an outer body having an opening into which the inner body extends, the inlet and outlet passages and the flow restriction being formed in the inner body, and the condensate receiving chamber being formed in the outer body.

8. A device as claimed in claim 7, in which bores are formed in the inner body which extend from the inlet and outlet passages to the external surface of the inner body to provide the first and second flow passageways.

9. A device as claimed in claim 1, in which the bores open into respective annular grooves in the external surface of the inner body.

10. A device as claimed in claim 7, in which a bore is formed in the outer body to provide the second flow passage.

11. A condensate trap assembly comprising a condensate trap having an inlet and a monitoring device, the monitoring device comprising:
    an inlet passage;
    an outlet passage;
    a first flow path in fluid communication between the inlet passage and the outlet passage;
    a flow restriction provided in the first flow path;
    a second flow path in fluid communication between the inlet passage and the outlet passage;
    a condensate receiving chamber provided in the second flow path at a level below the inlet passage, the condensate receiving chamber being closed at its lower end;
    a first flow passageway in fluid communication between the inlet passage and the condensate receiving chamber;
    a second flow passageway in fluid communication between the outlet passage and the condensate receiving chamber, the second passageway opening into the condensate receiving chamber at a first level which is above the lower end of the condensate receiving chamber; and
    a sensor having a sensor element disposed within the condensate receiving chamber at a second level, wherein the second level is above the first level.

* * * * *